United States Patent [19]

Krane

[11] Patent Number: 4,971,561

[45] Date of Patent: * Nov. 20, 1990

[54] APPARATUS AND METHOD FOR LEARNING ABOUT THE RELATIONSHIPS AND PERSONALITIES OF A GROUP OF TWO OR MORE PERSONS

[75] Inventor: Leonard Krane, Los Angeles, Calif.

[73] Assignee: Charisma Colors, Inc., Los Angeles, Calif.

[*] Notice: The portion of the term of this patent subsequent to Jul. 28, 2004 has been disclaimed.

[21] Appl. No.: 285,811

[22] Filed: Dec. 16, 1988

Related U.S. Application Data

[63] Continuation-in-part of Ser. No. 90,120, Aug. 27, 1987, Pat. No. 4,815,976.

[51] Int. Cl.$^5$ .................. G09B 19/00; A63F 3/00
[52] U.S. Cl. .................................... 434/237; 273/243
[58] Field of Search ............... 434/237; 273/296, 256, 273/273, 238, 243

[56] References Cited

U.S. PATENT DOCUMENTS

| | | | |
|---|---|---|---|
| 509,881 | 12/1893 | Doerflinger | 273/296 |
| 2,026,082 | 12/1935 | Darrow | 273/256 |
| 3,674,274 | 7/1972 | Shur | 273/273 |
| 3,733,074 | 5/1973 | Daley | 273/238 |
| 3,777,413 | 12/1973 | Zaccheo | 434/237 |
| 3,778,911 | 12/1973 | Woolman | 434/237 X |
| 3,948,525 | 4/1976 | Faintuch et al. | 273/273 |
| 4,205,464 | 6/1980 | Baggott | 434/237 |
| 4,216,594 | 6/1980 | Farley et al. | 273/243 X |
| 4,354,844 | 10/1982 | Ickinger | 434/237 |
| 4,635,939 | 1/1987 | Makow | 273/296 |
| 4,682,956 | 7/1987 | Krane | 434/237 |
| 4,815,976 | 3/1989 | Krane | 434/237 |

FOREIGN PATENT DOCUMENTS

2484849 12/1981 France .

OTHER PUBLICATIONS

*The Luscher Color Test*, edited by Ian A. Scott, Based on the Original German Text by Dr. Max Luscher, ©1969.

The Game Marketed Under the Trademark "Trivial Pursuit", ©1981. Selchow and Righter Co.

*Primary Examiner*—William H. Grieb
*Attorney, Agent, or Firm*—Lyon & Lyon

[57] ABSTRACT

An apparatus and method for learning about the relationships and personalities among a group of participating persons, wherein a plurality of players can utilize tokens on a board in combination with a plurality of color cubes, scoring sticks, secret answer wheels, and question cards in the preferred embodiment of the invention. Scoring and the movement of the tokens is controlled by a combination of chance and the participating persons' knowledge of each other, as revealed by the secret answering of questions related to the present and future feelings and intentions of given persons chosen to be participants. Scoring is noted by insertion of relationship sticks into color cubes located on the tokens. The color personalities of the participating persons are reflected in individual participating person's sequential choice of color cubes for that person's token and thus effects the content of questions to be asked and answered relating to the personality of the participant. A predicted answer is given for comparison with answers given by the players. The predicted answer is based upon psychological profiles developed for a given color personality which corresponds to the color personality of the participant player who is answering a given question.

25 Claims, 3 Drawing Sheets

APPARATUS AND METHOD FOR LEARNING ABOUT THE RELATIONSHIPS AND PERSONALITIES OF A GROUP OF TWO OR MORE PERSONS

RELATED APPLICATIONS

This application is related to U.S. Pat. No. 4,682,956 and is a continuation-in-part of U.S. Pat. No. 4,815,976 of the same title, filed Aug. 27, 1987, the disclosure of which is specifically incorporated herein by reference.

BACKGROUND OF THE INVENTION

The invention relates to an apparatus and a method for learning about the relationship and personalities of two or more persons and more particularly to an apparatus and a method that determines which person is both better known to the other persons and knows the other persons better.

Games are known in which the players must utilize their knowledge of each other for tactical purposes, in anticipating the reactions of other players to chance events and the players' movements. However, such games are usually played for fun and have little educational value. To the extent that existing games are also educational, such as improving a person's vocabulary or other skills, then such games tend to focus on improving a player's own knowledge or skill. Thus, there exists a need for a simple and enjoyable apparatus and method for learning more about the personalities of other people so that the participants can improve their relationships and learn more about themselves and others in the process as well as improving relationships between the players. Other than U.S. Pat. No. 4,682,956 and U.S. Ser. No. 090,120, filed Aug. 27, 1987, no games or other apparatus are known that directly involve the personalities of the players both in order to determine movements on the game board and also to determine the overall personality of the player and no method is known that acts to reveal the participants' knowledge of each other and thus their relationships.

It is known that the selection of colors can provide insight into psychological preferences of a human being. This concept has been set forth in many publications by M. Luscher and has been described in a book entitled, "The Luscher Color Test." A translated version of this book, edited by Ian A. Scott, has been published by Random House, Inc. Library of Congress Catalog Card Number: 70-85562, the disclosure of which is specifically incorporated herein by reference. However, while this relationship has been known for decades to psychologists, and the test has been used for certain informational purposes such as in connection with employment applications, the test has not found widespread instructive use in the community as a whole. Accordingly, the benefits and insight which can be achieved by use of the teachings of M. Luscher have not been fully developed. Thus, there exists a long felt need to incorporate the teachings of M. Luscher in an apparatus and method which can provide a simple, but yet enjoyable, vehicle for learning more about the psychological preferences of two or more persons.

SUMMARY OF THE INVENTION

The method of the present invention comprises choosing a first and a second person from a group of two or more persons practicing the method, selecting which of the first and second persons is to be a participant, selecting one of a plurality of questions together with possible answers to be asked related to the personality or character of the participant, and if the participant is the first person, recording a secret answer of the second person to the selected question whereas if the participant is the second person, recording the secret answer of the first person to the selected question, announcing the answer of the participant, and comparing the answer of the participant with the secret answer. Numerous variations and additions to this method are possible.

The apparatus of the present invention may comprise a board, dice, tokens, perforated color cubes, relationship sticks, question cards, card boxes, and answer wheels. In the preferred embodiment, the apparatus is embodied in a game so as to provide an entertaining vehicle for practicing the present invention.

An advantage of the present invention is that it may be adapted to provide a method and apparatus which depends upon answering questions about participating persons' preferences, desires, needs, actions, and the like. The questions and the corresponding possible answers are related to the personality or character of the participant by being keyed to the "color personality" of each participating person. Once the "color personality" has been utilized to select a question, the category of questions with possible answers is utilized to learn more about the relationships and personalities of the group of persons. Further, a predicted answer based upon the color personality of the participant is also given so that the chosen answer can be compared to the predicted answer.

A further advantage of the present invention is that it provides a method and apparatus which may enhance the relationships of the players through increasing their knowledge about each other and themselves.

Thus, an object of the present invention is to provide a method and apparatus for determining which participating person is both better known to the other participating persons and/or knows the other persons better, which may assist the participating persons to determine the nature of their personalities and relationships.

This and yet additional objects and features of the invention will become apparent in the detailed discussion below of the preferred embodiment of the invention.

BRIEF DESCRIPTION OF THE DRAWINGS

In order that the principle of the invention may be readily understood, a single preferred embodiment of the apparatus thereof is disclosed in the accompanying drawings, wherein.

DESCRIPTION OF THE PREFERRED EMBODIMENT

1. Apparatus for use in practicing the method of the preferred embodiment

Figure 1:
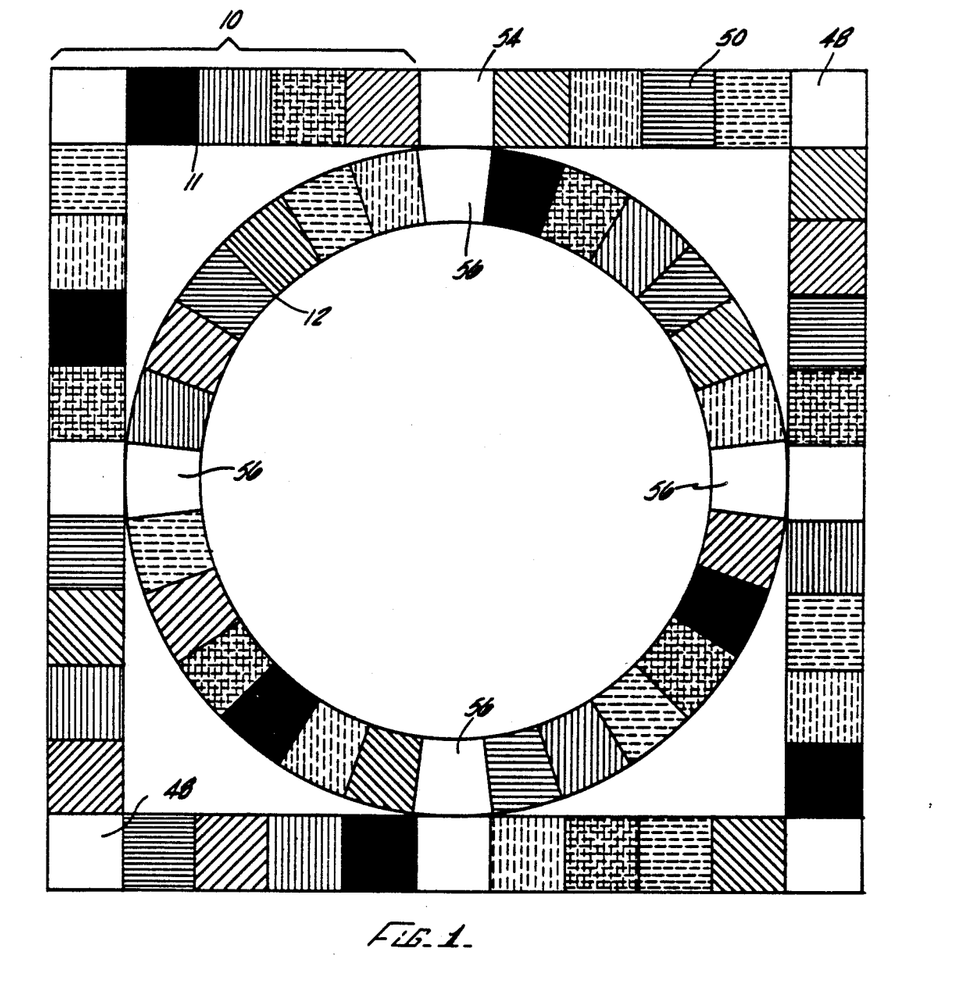
FIG. 1 is a plan view of one form or arrangement of board for the apparatus, the distinctive colors for the colored positions, spaces or segments being indicated thereon according to the chart for draftsmen in the Patent and Trademark Office Rules of Practice.

A preferred apparatus includes a board, indicated as a whole as 10 in FIG. 1. Imprinted on the upper surface of the board 10 are paths or courses 11 and 12 formed of colored spaces or segments. One path, 11, is rectangular and follows the perimeter of the board; the other, 12, is circular and is contained by the rectangular path, to which it is congruent at four points. The colors of the spaces or segments are alternatively red, blue, green, yellow, black, grey, violet, and brown with white spaces interspersed therewith.

Figure 2:
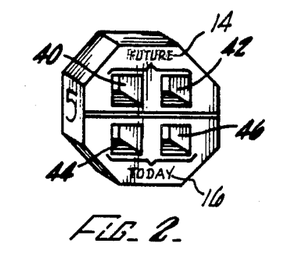
FIG. 2 is a view in elevation of one of the symbols or tokens which are used by the several participating persons to indicate their positions on the courses depicted on the board.

A plurality of tokens are provided and a token bearing the token number 5 is shown in FIG. 2. The tokens can be made of a thermoplastic material and contain four openings, receptacles or slots 40, 42, 44 and 46.

The openings 40 and 42 are in the "FUTURE" set of openings 14, and openings 44 and 46 are in the "TO-DAY" set of openings 16.

Figure 3:
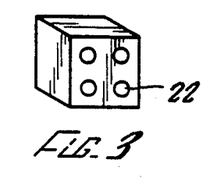
FIG. 3 is a view in elevation of a color cube which may be placed in one of the openings or slots on a participating person's token.
Figure 4:
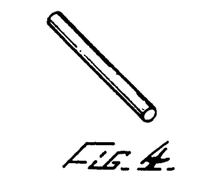
FIG. 4 is a side view of a relationship stick which is intended to be inserted into one of the holes in the color cubes.

Each token may hold four color cubes or pieces in its openings. The color cubes are placed in the openings according to a procedure to be described below. A representative color cube is shown in FIG. 3. If six tokens are provided, then forty-eight color cubes are provided, and are divided into eight sets, six each colored red, blue, green, yellow, black, grey, violet, and brown. The color cubes contain four perforations 22. Four relationship sticks can be inserted into each color cube. Of course, as would be apparent to one of ordinary skill in the art, the number of tokens, color cubes, relationship sticks and perforations can be varied without departing from the scope of the present invention.

Figure 5A:
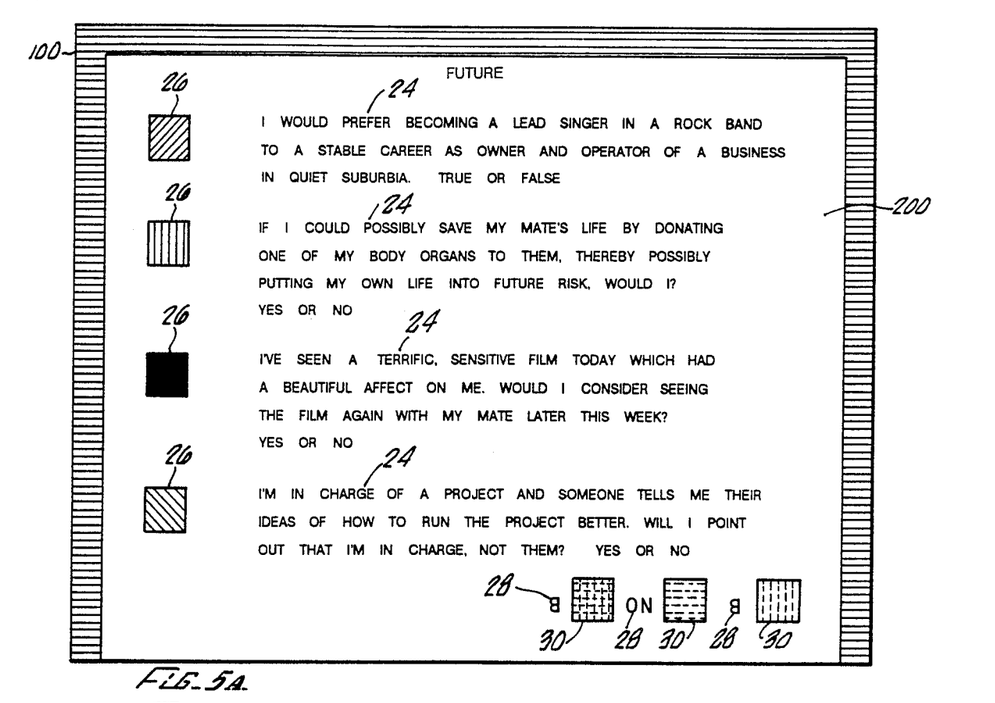
FIG. 5 represents one of the question cards used to provide the questions concerning personality, which are to be answered by the participating persons.
Figure 5B:
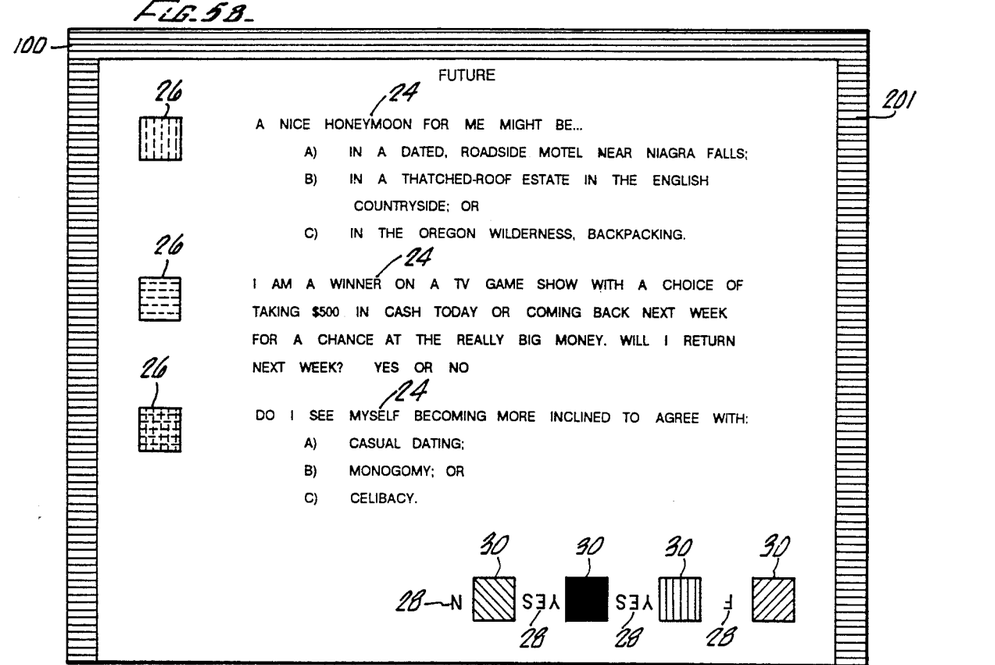

Question cards are either FUTURE or TODAY cards. The FUTURE and TODAY cards are provided in eight sets each, of 40 cards each, for a total of 320 FUTURE cards and 320 TODAY cards. The cards of each set have color borders of one of eight colors: red, blue, green, yellow, black, grey, violet, and brown. An example of one FUTURE card is shown in FIG. 5. A first side of each card (shown generally as 200 in FIG. 5) contains four questions 24 and a second side of each card (shown generally as 201 in FIG. 5) contains three questions 24; each of the questions is preceded by a colored marker or indicator 26 which is one of the eight colors used in the apparatus, i.e., red, blue, green, yellow, black, grey, violet and brown, but not that of the colored border of the card. Each question marker 26 in a given card will have a different color. The questions can conveniently require either a yes/true or no/false answer or a multiple choice answer (e.g., an answer identified by symbols such as A, B or C). A predicted answer 28 for each question 24 of the first side 200 is contained on the second side 201 and is preceded by a colored marker or indicator. 30 to indicate which question 24 the answer 28 is for. The predicted answer 28 for each question 24 of the second side 201 is contained on the first side 200 and is preceded by a colored marker or indicator 30 to indicate which question 24 the answer 28 is for. Of course, the number of question cards can be varied and additional question cards could be provided as is currently common in connection with a popular game marketed under the trademark Trivial Pursuit.

The color coded sets of questions to be used with the preferred embodiment of the invention are in part based upon personality concepts evolved from color preference tests. The "color personalities" of participating persons are based upon the sequence of their choice of four color cubes for their tokens and may vary from game to game as the moods and attitudes of participating persons shift and evolve. However, a key aspect of the present invention is that the initial sequential choice of color cubes by each player be related to aspects of personality and behavioral preferences of the player. While the present description utilizes the choice of color cubes, the means by which the color choices are made can vary so long as the initial selection process relates to selections keyed to the "color personality" of the players. Indeed, it is also contemplated that a player be required to select more than four color cubes in an advanced version of apparatus according to the present invention. Further, the first two color cubes chosen relate to the participant's desired future behavior and/or state of mind. The next two color cubes chosen relate to the participant's present behavior and/or state of mind. Questions and corresponding answers are based in part upon the principles of personality profiles developed from the Luscher color test which reveal personality through sequential color choices. The questions on a given color border card are keyed to the "color personality" of the player. For example, red border cards have different types of questions and answers than would any other colored border cards.

By knowing the personality profiles which have been described in the book "The Luscher Color Test" referenced in the "Background of The Invention" set forth above, questions and corresponding answers can be designed such that the combination of a given question with a predicted answer will reflect a personality and/or behavioral characteristic which would fall within or relate to a given personality profile. Thus, to the extent that a player knows the personality of another player who is designated to answer the question, that player should be able to correctly predict the answer which will be given to the question by the other player. For example, if the person to answer the question had selected blue and grey for the FUTURE color cubes, then part of the personality profile of that person would be "Needs release from stress. Longs for peace, tranquility and contentment." Quoted from "The Luscher Color Test", translated and edited by Ian Scott, POCKET BOOK edition published September 1971, Standard Book Number: 67-78653-5, Library of Congress Catalog Card Number 70-855 62, at page 97, which is directed to interpretation tables, whereas another part of the personality profile relating to structural meaning of the color pairs is set forth elsewhere in the book, the disclosure of which is specifically incorporated herein by reference. To relate to the personality and/or behavioral characteristic, a question with corresponding answers, by way of example only, is set forth in FIG. 5 as follows: "I am a winner on a TV game show with a choice of taking $500 in cash today or coming back next week for a chance at the really big money. Will I return next week? Yes or No." Based upon the given personality profile, as revealed by the sequential choice of blue and grey colors, respectively, to reflect the present color personality of the person who is to answer the question, the predicted answer of a person answering the question based upon a color personality choice of colors of blue and grey would be "No." Further examples of questions, for different combinations of colors for a FUTURE personality, are set forth in FIG. 5.

Figures 1, 7:
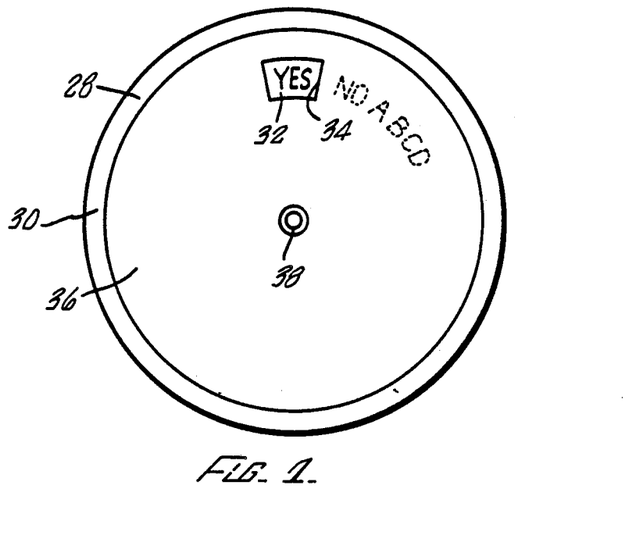
FIG. 7 is a view in elevation of an answer wheel which is used by the participating persons to secretly indicate their answers to questions concerning another person's personality.
Figure 6:
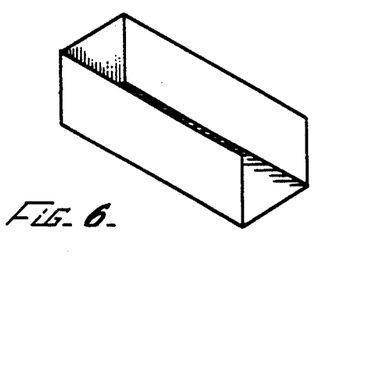
FIG. 6 is a perspective view of one of the card boxes used to hold the question cards of the preferred embodiment.

A card box, one of which is shown in FIG. 6, holds the eight sets of question cards, one box per set for the FUTURE or the TODAY sets of cards. Six answer wheels are provided which permit participating persons to secretly record their choice of answers to questions posed from the question cards. One of the answer wheels is indicated as a whole in FIG. 7, generally designated as 28. The answer "YES/TRUE", which is printed on outer disc 30 and indicated as 32, appears through the window 34 of inner disc 36. Outer disc 30 may be rotated about a rivet axis 38 to change the answer. Other means of secretly recording an answer could be used, such as choosing answer cards, writing down the answer on paper and the like. Electronic answer recording devices might also be used.

Figure 8:
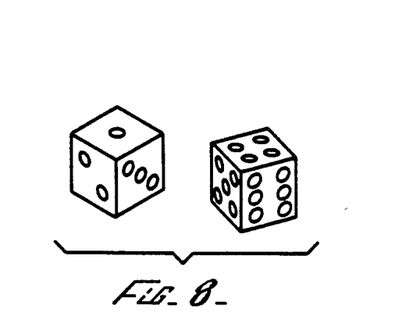
FIG. 8 represents in perspective the dice used to determine the extent or length of the moves of the participating persons along the paths or courses depicted on the board of the apparatus.

A pair of dice, shown in FIG. 8, are used to randomly determine movements of tokens, as will be explained below. Other means for generating random numbers, such as a spinner, could also be provided for this purpose.

While the preferred embodiment of the present invention utilizes eight sets of FUTURE question cards and eight sets of TODAY question cards, an equivalent result could be obtained by using more cards or sets of cards or fewer cards or sets of cards. In addition, each of the FUTURE and TODAY groups of eight sets of question cards could be broken down into fifty-six sets of questions since there are fifty six potential sequential combinations of two different colors from a set of eight possible color choices. Thus, for example, one set of questions might relate to the present behavior and state of mind when the participant has selected the colors blue and yellow as the participant's third and fourth preferred colors, respectively. Accordingly, while the actual number of sets of question cards can vary, there have to be questions available to correspond to the one hundred twelve different possible combinations, and whether the questions are contained in eight sets of question cards, sixteen sets of question cards, one hundred twelve sets of question cards or some other number of sets of question cards is simply a matter of design choice which will ultimately lead to the same result, that is, having the given question relate to either the desired future behavior and state of mind or the present behavior and state of mind of the participant, the choice of the given question being related to the color personality of the participant, the color personality being related to sequential selection by the participant of a first, a second, a third and a fourth preferred color from the group of eight colors according to color preference of the participant. Of course, if it is desired to only learn about the desired future behavior and state of mind of the participant as perceived by the participant or the present behavior and state of mind as perceived by the participant, then there would only be fifty-six different possible color combinations related to the color personality of the participant and the number of question cards or questions could be reduced provided questions were available to correspond to the fifty-six different possible combinations.

While the preferred embodiment has been described in terms of "cards", an equivalent result could be obtained by storing the questions electronically or by some other storage means. Thus, for example, if the questions were stored electronically, such as in a computer, then a participant's sequential selection of a first through a fourth preferred color would automatically define the two sets of questions related to the participant's color personality, and only those two sets of questions would be used in connection with the participant. However, in order for such an embodiment to work, while only two sets of questions would be necessary, it is apparent that the selection of the two sets of questions is made from a pool of one hundred twelve possible sets of questions.

2. The method for determining relationships and personalities according to the preferred embodiment of the invention A method for learning about the relationships and personalities according to the present invention may be practiced by two or more participating persons utilizing the preferred apparatus described above. The board 10 is placed on a table or other convenient location and each color set of question cards is aligned within a card box on the table. Each participating person takes one token and one answer wheel. Each participating person in turn rolls the dice, with the participating person rolling the highest number commencing the practice of the method. The participating person initiating the practice of the method is called the First Person. As will be described later, the participating persons can alternate the role of First Person among themselves. In addition, while the selection of the person commencing the practice of the method has been described as the function of a random selection process, the players could choose the person to commence the method, or the sequence by which the method would be practiced, by any appropriate process agreed upon among themselves.

The First Person places in front of him or her one color cube of each of the eight colors in any color sequence, for a total of eight color cubes. The First Person then chooses the color cube he or she likes best and places it in the token in the left opening 40 of the FUTURE set of openings 14, places the next-best liked color in the right opening 42 of the FUTURE set of openings 14, places the third-best liked color cube in the left opening 44 of the TODAY set of openings 16 and places the fourth-best liked color cube in the right opening 46 of the TODAY set of openings 16. The four remaining color cubes rejoin the rest of the color cubes. While color cubes have been utilized in the instant description as physical indicia that relate to the person's color personality, it would be apparent to one of ordinary skill in the art that other physical color indicia could also be utilized.

The other persons in turn each repeat this "color personality" selection process for their tokens. The sequential color choices may vary with a person's moods for any session at which the method of the present invention is practiced.

The First Person then places his or her token or marker on any corner space 48 on the board, rolls the dice and moves the token the number of spaces indicated in any direction that follow a playing path or course. The token may be moved, during the move, to the border spaces that form the rectangular path II or to the spaces that form the inner circle path 12. Direction may be changed on subsequent moves. If the token lands on a border color space matching one of the four color cubes in the FIRST PERSON's token, a question from a set of question cards will be chosen according to a process described below. If the token lands on a color space not matching one of the four color cubes in the token (except for white—see below) the participating person on the left of the First Person assumes the role of First Person.

Each card has either three or four questions on each side. Questions can conveniently be of two types, either answered Yes/True or No/False or with multiple choice answers which are marked or identified as A, B, or C. Each question is next to one of seven colored squares or markers 26. (For example, a card from the blue set has squares, on its first and second sides, colored red, green, yellow, black, grey, violet and brown.) The questions are keyed to the "color personality" of the participating persons, based upon each participating person's sequential choice of four of the eight color cubes for his or her token for each game.

To describe the selection process of the preferred embodiment of the present invention for question card sets and individual questions along with their corresponding possible answers, suppose the First Person has blue and yellow cubes in the left and right FUTURE set of openings 14 of the token and red and green cubes in the left and right TODAY set of openings 16. Because the color cubes in the left openings of the FUTURE and TODAY set of openings will always determine the color set of cards from which a card will be drawn, questions to be answered by the First Person will be drawn from either the blue set of FUTURE cards or the red set of TODAY cards. Thus, if the First Person lands on a blue or yellow border space 52, the first card from the blue set of FUTURE cards is drawn, turned to the side with a yellow colored marker or indicator 30, and the question along with its corresponding possible answers next to the yellow marker or indicator are read aloud by the First Person. The First Person will ultimately answer the read-aloud question and corresponding answers with respect to his or her personality because his or her token landed on a border space. In similar fashion, if the First Person lands on a green or red border space 52, the first card from the red set of TODAY cards is drawn, turned to the side with a green colored marker or indicator 30, and the question along with its corresponding possible answers next to the green marker or indicator 3 are read aloud by the First Person and the Second Person records a secret answer. The First Person will ultimately answer the question and corresponding answers with respect to his or her personality because the token landed on a border space. As used herein, the term "secret answer" defines an answer which is not known to the person answering the question but may or may not be secret as to other members of the group. The First Person then answers the question aloud and the secret answer is revealed. If the secret answer is the same as the First Person's answer, the correct match-up of answers will result in an award of one or more relationship sticks. In a first method, the First Person places one relationship stick in his or her token's color cube that matches the color space landed on. In a second method according to the present invention, the First Person and the Second Person may both receive relationship sticks for a correct match-up and the Second Person can place the relationship stick in any of his or her color cubes whereas the First Person can place the relationship stick in the token color cube that matches the color space the First Person landed on. Alternative methods for indicating success would be to tally points on paper or otherwise, award physical objects other than relationship sticks as indicia of success, and the like.

After the answer of the participant has been compared with the secret answer, the answer of the participant and the secret answer can be compared with the predicted answer based upon the color personality of the participant. While no points are awarded for matches of answers with the predicted answer in a preferred embodiment, alternative embodiments could award a variety of points for such a match as would be apparent to one of ordinary skill in the art. However, by comparing the answer of the participant, and by necessity the secret answer, with the predicted answer, discussion can be stimulated as to why answers either do or do not match up with the predicted answer. For example, the participant and/or the players might question whether the participant accurately answered the given question according to his or her feelings. Indeed, the participant might even reexamine his or her choice of answer and admit that a different answer might have been appropriate. The point of comparison of the answer of the participant with the predicted answer is not to suggest a false answer or dictate what answer should have been selected; rather, it is meant to provide a further stimulus for discussion to allow the persons involved to better determine the nature of their personalities and relationships and encourage discussion to thereby promote and foster further understanding and learning, hopefully in an enjoyable and entertaining setting.

The practice of the method then continues with another roll of the dice. Cards are placed in the rear of the color set after each question.

For convenience, the person to whom questions are directed will hereinafter be called the "Participant". The Participant may or may not be the First Person in an optional arrangement. If the First Person lands on a border space that matches the color of a color cube on that person's token, the First Person is the Participant whereas if the First Person lands on an inner circle space that matches the color of a color cube on another person's token, the First Person can choose whether either the First Person or a Second Person will be the Participant.

As is apparent from the above description, border and inner circle spaces can reveal personalities and relationships through other participating persons' knowledge of the First Person whereas in an optional arrangement inner circle spaces can reveal personalities and relationships through the First Person's knowledge of other participating persons.

The First Person's token may be moved into the inner circle color spaces at spaces in the inner circle path congruent to the border path. Here, in an optional arrangement, the color space landed on relates to the color cube in the TODAY or FUTURE section of the token of any participating person (the "Second Person") designated by the First Person that matches the color of the space landed on by the First Person. The Second Person picks the question card and reads the matching color question and corresponding answers according to the procedure described above for the First Person when in the rectangular border course since the Second Person is now the Participant. The First Person uses the answer wheel to secretly answer the question while the designated Second Person answers the question aloud. If the First Person's secret answer is correct, a relationship stick is inserted into any of the First Person's color cube needed for scoring. If the method is being practiced such that both the First and Second Persons receive a relationship stick for a correct answer, then the Second Person inserts a relationship stick into the Second Person's color cube that matches the color space which the First Person landed on. After the answer of the participant has been compared with the secret answer, then the predicted answer is revealed as was discussed above. The practice of the method then continues with another roll of the dice if the First Person has chosen the correct secret answer; otherwise the person to the First Person's left becomes the First Person.

If a token lands on a white border space 48, the First Person may roll the dice again. If the token lands on a white space 54 or a white inner circle space 56, the First Person may move to any color space he or she desires.

For the shortest practice of the method of the preferred embodiment of the invention, the participating person best acquainted with and/or best known to the other participating persons (the best-related person) is the first to be able to put one relationship stick in each of the four color cubes in that person's token. In the case of a tie, during a move, the First Person is the winner.

A longer way to practice the method requires the best related participating person to insert four relationship sticks in each of the four color cubes in the token. Intermediate levels would require two relationship sticks, or three sticks, in each color cube while advance play might require additional color cubes in the token and/or more relationship sticks in each color cube. Variations could simply require an arbitrary number of sticks in the token.

The group of persons should decide before the practice of the method begins whether they may discuss answers during the game and also whether they should accept time limits for discussion in order to allow the method to proceed.

As will be apparent to those skilled in the art in light of the preceding disclosure, many modifications, alterations, and substitutions are possible in the method and apparatus of this invention without departing from the spirit or scope thereof. Thus, for instance, while the method for determining relationships and personalities has been described in connection with the preferred apparatus, which utilizes a board, there is no reason why the method could not be practiced by utilizing some other method such as, by way of example only, using a means like a spinner or a color wheel to pick a color which is then used to determine which question is asked to the participant. Thus, for example, the method might be adapted for use in a television game show such as the popular current television game shows Jeopardy, Wheel of Fortune or the New Newlywed Game, so long as the questions relate to the color personality of the participant as described herein. Accordingly, the invention is not intended to be limited to the particular methods and apparatus described herein except as may be required by the lawful scope of the following claims.

What is claimed is:

1. A method for learning about the relationships and personalities of a group of two or more persons, comprising:
    choosing a first person and a second person from the group of persons;
    choosing either the first person or the second person to be a participant;
    selecting a plurality of questions having predicted answers from among a set of pluralities of questions at least in part according to a color personality as revealed by a sequential selection of a plurality of colors and selection by the first person of physical indicia that match or relate to the first person's color personality, the plurality of questions being directly identified with the physical indicia selected by the first person;
    selecting one of the plurality of questions to be answered, the selection being related to a color personality or preference of the participant;
    if the participant is the first person, recording a secret answer of the second person to the selected question whereas if the participant is the second person, recording the secret answer of the first person to the selected question;
    revealing the answer of the participant;
    comparing the answer of the participant with the secret answer; and
    comparing the answer of the participant with said predicted answer based upon the color personality of the participant.

2. The method according to claim 1 in which the physical indicia have different colors to be chosen sequentially by the first person.

3. The method according to claim 1 in which the step of selecting one of the plurality of questions to be asked related to the color personality of the participant comprises the steps of selection of physical color indicia that match or relate to a participant's personality characteristic, the question to be asked then being directly identified with the physical color indicia.

4. The method according to claim 3 wherein the first person sequentially selects at least four different colors from a group of at least eight different colors.

5. The method according to claim 1 in which the step of choosing the first and the second person comprises alternating the position of the first person among the members of the group of persons practicing the method.

6. The method according to claim 5 in which the step of choosing the first and the second persons comprises the step of the first person choosing the second person.

7. The method according to claim 1 in which the question related to the color personality of the participant is related to the present behavior and state of mind of the participant as perceived by the participant.

8. The method according to claim 1 in which the question answered by the participant is related to the participant's desired future behavior and state of mind as perceived by the participant.

9. A method for learning about the relationships and personalities of two or more persons, comprising the steps of:

sequential selection by a first person of a first, a second, a third and a fourth preferred color from a group of eight colors, the selection being made in order of color preference of the first person;

sequential selection by a second person of a first, a second, a third and a fourth preferred color from the group of eight colors, the selection being made in order of color preference of the second person;

choosing either the first person or the second person to be a participant;

choosing whether a given question relating to a color personality of the participant is related to a present behavior and state of mind of the participant as perceived by the participant or a desired future behavior and state of mind of the participant as perceived by the participant, the color personality being related to sequential selection by the participant of a first, a second, a third and a fourth preferred color from the group of eight colors according to color preference of the participant;

selecting a set of question cards (having corresponding predicted answers) from eight sets of question cards, each set of question cards being related to a different color from the group of eight colors, each of the eight colors being related to one set of question cards;

selecting a chosen card from the set of question cards, said chosen card having seven questions, each of the seven questions being related to its own color selected from the group of eight colors but not the color related to the set of question cards;

selecting the given question from the chosen card, the selection and the given question being related to the color personality of the participant, the given question to be directed to the participant;

if the participant is the first person, then the second person chooses a secret answer to the given question which the second person thinks the first person will answer, or, if the participant is the second person, then the first person chooses the secret answer to the given question which the first person thinks the second person will answer;

revealing the answer of the participant;

comparing the answer of the participant with the secret answer; and comparing the answer of the participant with said predicted answer based upon the color personality of the participant.

10. A method as recited in claim 9 wherein the set of questions cards is selected by matching the first preferred color of the participant with the same color which is related to said set of question cards when the given question is related to the desired future behavior and state of mind of the participant or by matching the third preferred color of the participant with the same color which is related to said set of question cards when the given question is related to the present behavior and state of mind of the participant.

11. A method as recited in claim 10 wherein the given question is selected from the chosen card by matching the second preferred color of the participant with the same color which is related to said given question when the given question is related to the desired future behavior and state of mind of the participant or by matching the fourth preferred color of the participant with the same color which is related to said given question when the given question is related to the present behavior and state of mind of the participant.

12. A method as recited in claim 11 wherein the eight colors comprise red, blue, green, yellow, black, grey, violet and brown.

13. A method for learning about the relationships and personalities of one or more persons, comprising the steps of:

choosing either a first person or a second person to be a participant;

choosing whether a given question relating to a color personality of the participant is related to a desired future behavior and state of mind of the participant as perceived by the participant or a present behavior and state of mind of the participant as perceived by the participant, the color personality being related to sequential selection of colors by the participant, the desired future behavior and state of mind being related to a first and a second preferred color chosen from a group of eight colors, the present behavior and state of mind being related to a third and a fourth preferred color chosen from the group of eight colors, said first, second, third and fourth preferred colors being chosen by the participant from the group of eight colors according to color preference of the participant;

selecting a given set of questions (having corresponding predicted answers) from either a first group of fifty-six possible sets of questions relating to the desired future behavior and state of mind of the participant, each of said fifty-six possible sets of questions being uniquely identified with the sequential selection of two different colors in the group of eight colors, or selecting the given set of questions from a second group of fifty-six possible sets of questions relating to the present behavior and state of mind of the participant, each of said fifty-six possible sets of questions being uniquely identified with the sequential selection of two different colors in the group of eight colors, said selection being made by either matching the first and the second preferred color of the participant to the set of questions in the first group of fifty-six possible sets of questions which is uniquely identified with the sequential selection of the first and the second preferred color or by matching the third and the fourth preferred color of the participant to the set of questions in the second group of fifty-six possible sets of questions which is uniquely identified with the sequential selection of the third and the fourth preferred color;

selecting the given question from the given set of questions;

if the participant is the first person, then the second person chooses a secret answer to the given question which the second person thinks the first person will answer, or, if the participant is the second person, then the first person chooses the secret answer to the given question which the first person thinks the second person will answer;

revealing the answer of the participant;

comparing the answer of the participant with the secret answer; and comparing the answer of the participant with said predicted answer based upon the color personality of the participant.

14. A method as recited in claim 13 wherein the eight colors comprise red, blue, green, yellow, black, grey, violet and brown.

15. A method of learning about the relationships and personalities of one or more persons, comprising the steps of:

choosing either a first person or a second person to be a participant;

either selecting a given question from a group of fifty-six questions (having corresponding predicted answers) relating to a desired future behavior and state of mind of the participant as perceived by the participant, each of said questions being uniquely identified with and related to sequential selection of a different sequence of a first and a second color from a group of eight colors, said selection of the given question being related to a color personality of the participant, said selection being made by choosing a question relating to the sequence of a first and a second color which matches a first and a second preferred color of the participant as the given question, or selecting the given question from a group of fifty-six questions relating to a present behavior and state of mind of the participant as perceived by the participant, each of said questions being uniquely identified with and related to sequential selection of a different sequence of a first and a second color from the group of eight colors, said selection of the given question being related to the color personality of the participant, said selection being made by choosing a question relating to the sequence of a first and a second color which matches a third and a fourth preferred color of the participant as the given question, wherein said first, second, third and fourth preferred colors of the participant are chosen from the group of eight colors according to color preference of the participant;

if the participant is the first person, then the second person chooses a secret answer to the given question which the second person thinks the first person will answer, or, if the participant is the second person, then the first person chooses the secret answer to the given question which the first person thinks the second person will answer;

revealing the answer of the participant;

comparing the answer of the participant with the secret answer; and comparing the answer of the participant with said predicted answer based upon the color personality of the participant.

16. A method as recited in claim 15 wherein the eight colors comprise red, blue, green, yellow, black, grey, violet and brown.

17. An apparatus for learning about the relationships and personalities of two or more persons, comprising:

at least one set of eight physical color indicia, each color indicia representing a different color in a group of eight colors;

a plurality of tokens, each token having a first opening, a second opening, a third opening and a fourth opening, each opening being adapted to hold one physical color indicia;

eight sets of question cards, each set of question cards being related to one of the eight physical color indicia, each of the eight physical color indicia being related to one set of question cards, each card having seven questions and seven predicted answers, each of the seven questions and the seven predicted answers being related to its own physical color indicia selected from the eight physical color indicia except the physical color indicia related to the card for use in determining which question is to be chosen, a given question and a given predicted answer from a chosen question card being addressed to a player whose token has a pair of two openings holding a first physical color indicia and a second physical color indicia wherein the color represented by the first physical color indicia matches the color related to the set of question cards to which the chosen question card belongs and the color represented by the second physical color indicia matches the color related to the given question and the given predicted answer, the given question and the given predicted answer being related to a color personality determined by the colors represented by the first and second physical color indicia such that the given predicted answer will reflect a personality and/or behavioral characteristic which would fall within or relate to a given personality profile related to selection of the first and second physical color indicia; and a board having a plurality of colored spaces constituting at least one path or course, said plurality of colored spaces having at least one colored space representing each of the different colors represented by one set of eight physical color indicia.

18. An apparatus as recited in claim 17 wherein the group of eight colors comprises red, blue, green, yellow, black, grey, violet and brown.

19. An apparatus as recited in claim 18 further comprising:

a second set of eight sets of question cards, each set of question cards being related to one of the eight physical color indicia, each of the eight physical color indicia being related to one set of question cards, each card having seven questions and seven predicted answers, each of the seven questions and the seven predicted answers being related to its own physical color indicia selected from the eight physical color indicia except the physical color indicia related to the card for use in determining which question is to be chosen, a given question and a given predicted answer from a chosen question card being addressed to a player whose token has a pair of two openings holding a first physical color indicia and a second physical color indicia wherein the color represented by the first physical color indicia matches the color related to the set of question cards to which the chosen question card belongs and the color represented by the second physical color indicia matches the color related to the given question and the given predicted answer, the given question and the given predicted answer being related to a color personality determined by the colors represented by the first and second physical color indicia such that the given predicted answer will reflect a personality and/or behavioral characteristic which would fall within or relate to a given personality profile related to selection of the first and second physical color indicia.

20. An apparatus as recited in claim 19 wherein the first set of eight sets of question cards contain questions relating to a desired future behavior and state of mind and the second set of eight sets of question cards contain questions relating to a present behavior and state of mind.

21. An apparatus as recited in claim 20 wherein the given question from the chosen question card of the first set of eight sets of question cards is chosen by matching two physical color indicia in the first and the second openings of a token with the color related to the set of question cards to which the chosen question cards belongs and the color related to the given question, and the given question from the chosen question card of the second set of eight sets of question cards is chosen by matching two physical color indicia in the third and the fourth openings of the token with the color related to the set of question cards to which the chosen question card belongs and the color related to the given question.

22. A method for learning about the relationships and personalities of two or more persons, comprising the steps of:

(1) sequential selection by a first person of a first, a second, a third and a fourth preferred physical color indicia from a first set of eight physical color indicia, each color indicia representing a different color in a group of eight colors;

(2) sequential selection by a second person of a first, a second, a third and a fourth preferred physical color indicia from a second set of eight physical color indicia, each color indicia representing a different color in the group of eight colors;

(3) choosing either the first person or the second person to be a participant;

(4) choosing whether a given question relating to a color personality of the participant is related to a present behavior and state of mind of the participant as perceived by the participant or a desired future behavior and state of mind of the participant as perceived by the participant, the color personality and the given question being related to sequential selection by the participant of a first, a second, a third, and a fourth preferred color from the group of eight colors according to color preference of the participant, the choice being made by matching a color space on a board having a plurality of colored spaces constituting at least one path or course, said plurality of colored spaces having at least one colored space representing each of the colors in the group of eight colors, with either the first, the second, the third or the fourth preferred color of the participant, the given question relating to the desired future behavior and state of mind of the participant if the color space matches the first or the second preferred color of the participant or the present behavior and state of mind of the participant if the color space matches the third or the fourth preferred color of the participant;

(5) selecting a set of question (having corresponding predicted answers) cards from eight sets of question cards, each set of question cards being related to a different color from the group of eight colors, each of the eight colors being related to one set of question cards, by matching the first preferred color of the participant with the same color which is related to said set of question cards when the color space matches either the first or the second preferred color of the participant or by matching the third preferred color of the participant with the same color which is related to said set of question cards when the color space matches either the third or the fourth preferred color of the participant;

(6) selecting a chosen card from the set of question cards, said chosen card having seven questions, each of the seven questions being related to its own color selected from the group of eight colors but not the color related to the set of question cards;

(7) selecting the given question to be directed to the participant from the chosen card by matching the second preferred color of the participant with the same color which is related to said given question when the color space matches either the first or the second preferred color of the participant or by matching the fourth preferred color of the participant with the same color which is related to said given question when the color space matches either the third or the fourth preferred color of the participant;

(8) if the participant is the first person, then the second person chooses a secret answer to the given question which the second person thinks the first person will answer, or, if the participant is the second person, then the first person chooses the secret answer to the given question which the first person thinks the second person will answer, the secret answer not being revealed to the participant;

(9) revealing the answer of the participant;

(10) comparing the answer of the participant with the secret answer; and (11) comparing either the answer of the participant or the secret answer with said predicted answer based upon the color personality of the participant.

23. A method as recited in claim 22 wherein the eight colors comprise red, blue, green, yellow, black, grey, violet and 24. A method as recited in claim 23 comprising the further steps of:

(12) alternating the second person as the first person and the first person as the second person; and (13) repeating steps 3 through 11.

25. A method as recited in claim 22 wherein the given question is in part based upon a personality concept evolved from a color preference test.

* * * * *

UNITED STATES PATENT AND TRADEMARK OFFICE
CERTIFICATE OF CORRECTION

PATENT NO. : 4,971,561
DATED : NOVEMBER 20, 1990
INVENTOR(S) : Leonard Krane

It is certified that error appears in the above-identified patent and that said Letters Patent is hereby corrected as shown below:

Column 4, line 3, delete "." between "indicator" and "30";

Column 16, line 46, insert -- brown -- after "and";

Column 7, line 44, change "52" to -- 50 --;

Column 7, line 46, change "30" to -- 26 --;

Column 7, line 54, change "52" to -- 50 --;

Column 7, line 56, change "30" to -- 26 --;

Column 7, line 58, change "3" to -- 26 --.

Signed and Sealed this

Second Day of June, 1992

Attest:

DOUGLAS B. COMER

*Attesting Officer*     *Acting Commissioner of Patents and Trademarks*